(12) United States Patent
Cioffi et al.

(10) Patent No.: US 10,069,457 B2
(45) Date of Patent: Sep. 4, 2018

(54) SYSTEM FOR MOUNTING A MICROINVERTER TO A PHOTOVOLTAIC PANEL AND METHOD OF MAKING SAME

(71) Applicant: General Electric Company, Schenectady, NY (US)

(72) Inventors: Philip Michael Cioffi, Schaghticoke, NY (US); Mohammed Agamy, Schenectady, NY (US)

(73) Assignee: General Electric Company, Schenectady, NY (US)

(*) Notice: Subject to any disclaimer, the term of this patent is extended or adjusted under 35 U.S.C. 154(b) by 247 days.

(21) Appl. No.: 14/717,286

(22) Filed: May 20, 2015

(65) Prior Publication Data

US 2016/0344337 A1 Nov. 24, 2016

(51) Int. Cl.
*H01L 31/042* (2014.01)
*H02S 40/32* (2014.01)

(52) U.S. Cl.
CPC .................................. *H02S 40/32* (2014.12)

(58) Field of Classification Search
USPC .............................. 136/243–293; 363/15, 37
See application file for complete search history.

(56) References Cited

U.S. PATENT DOCUMENTS

| | | | |
|---|---|---|---|
| 5,898,585 A | 4/1999 | Sirichote et al. | |
| 6,259,027 B1* | 7/2001 | Watanabe | B60R 16/0207 174/101 |
| 6,410,362 B1 | 6/2002 | Simburger et al. | |
| 6,657,118 B2 | 12/2003 | Toyomura et al. | |
| 8,358,506 B2 | 1/2013 | Cooper et al. | |
| 9,685,904 B2 | 6/2017 | Cioffi et al. | |
| 2012/0255596 A1* | 10/2012 | Korman | F24J 2/5207 136/251 |

(Continued)

FOREIGN PATENT DOCUMENTS

WO 2010144637 A1 12/2010

OTHER PUBLICATIONS

APS M1P-UK Grid-connected Microinverter Installation and User Manual, Altenergy Power System Inc., Oct. 24, 2014, pp. 1-23.

(Continued)

*Primary Examiner* — Thanh Truc Trinh
(74) *Attorney, Agent, or Firm* — Ziolkowski Patent Solutions Group, SC; Jean K. Testa (57) ABSTRACT

A system and method for a microinverter mounting assembly including a microinverter assembly and a panel direct current (DC) connector. The microinverter assembly having a housing, a microinverter disposed within the housing, and a microinverter DC connector disposed within the housing and electrically coupled to the microinverter, the microinverter DC connector with a bottom panel having a locking recess formed therein and at least one electrical contact disposed within an opening formed in the bottom panel. The panel DC connector having a mounting substrate, a locking tab extending from the mounting substrate, and at least one electrical contact positioned on the mounting substrate. Further, the locking tab of the panel DC connector interfits within the locking recess of the microinverter DC connector to form a locking mechanism that prevents rotation of the microinverter DC connector when in a locked position.

15 Claims, 8 Drawing Sheets

(56) References Cited

U.S. PATENT DOCUMENTS

| 2012/0279747 | A1* | 11/2012 | Sella | H02G 3/083 |
| | | | | 174/59 |
| 2013/0002031 | A1 | 1/2013 | Mulkey et al. | |
| 2013/0016454 | A1 | 1/2013 | Sirignano | |
| 2014/0168927 | A1 | 6/2014 | Morris et al. | |
| 2016/0344335 | A1 | 11/2016 | Cioffi et al. | |

OTHER PUBLICATIONS

Enphase Microinverter Models M190™ and M210™ Installation and Operations Manual, Enphase Energy Inc., 2013, pp. 1-26.

* cited by examiner

SYSTEM FOR MOUNTING A MICROINVERTER TO A PHOTOVOLTAIC PANEL AND METHOD OF MAKING SAME

BACKGROUND OF THE INVENTION

Embodiments of the invention relate generally to a photovoltaic (PV) system, and more particularly to improved systems and methods for mounting a microinverter to a PV panel and forming an electrical connection therebetween.

Figure 1:
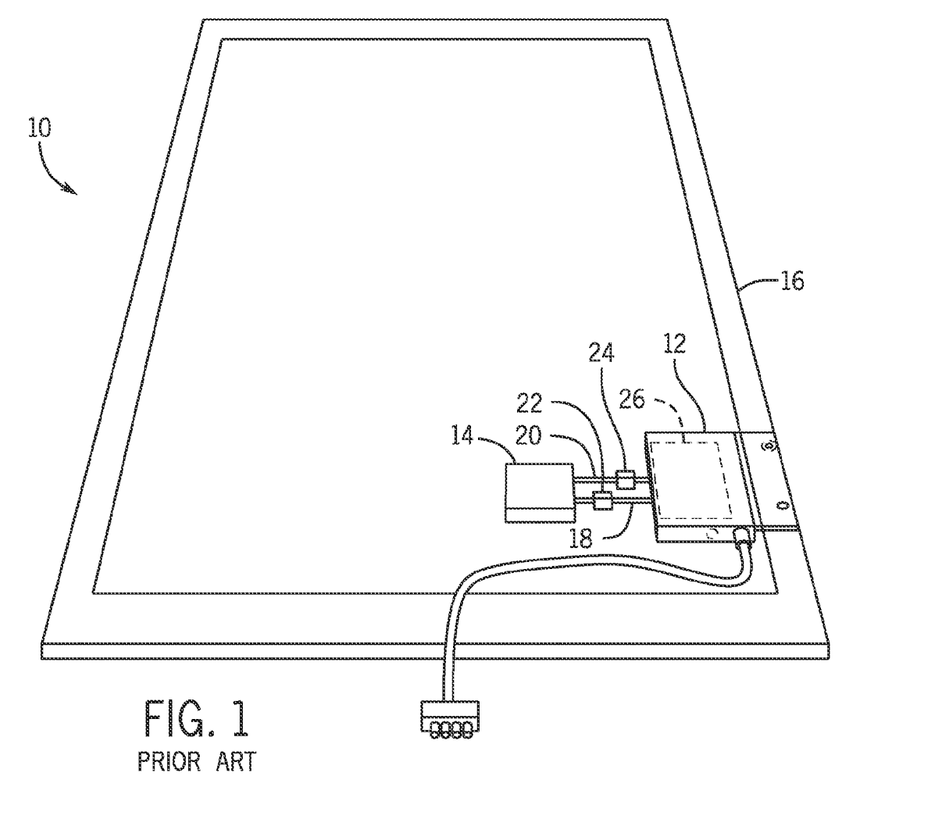
FIG. 1 is a perspective view of a prior art photovoltaic (PV) system.

PV systems include PV modules arranged in arrays that generate direct current (DC) power, with the level of DC current being dependent on solar irradiation and the level of DC voltage dependent on temperature. PV systems may be constructed either as an inverter system or a microinverter system. A typical inverter system uses DC wiring to electrically couple multiple PV panels to a single inverter. The inverter then converts the DC energy from the PV panels into AC energy, such as AC energy suitable for transfer to a power grid. A typical microinverter system, on the other hand, uses DC wiring and a junction box to electrically connect a microinverter to each PV panel, forming an AC PV module 10 as shown in FIG. 1. In this AC PV module system, each microinverter assembly 12 converts the DC energy from its respective panel into AC energy suitable for transfer to a power grid. The junction box 14 of each PV module 10 contains bypass diodes that allow each AC PV module 10 to maintain peak efficiency under partial shading conditions by bypassing sections of cells in the AC PV module 10 which are not receiving solar irradiation. By removing AC PV module cells that are not producing DC power from the electrical connection, the PV system ensures that these non-producing AC PV module cells do not draw DC power from the PV system, which may reduce power to the load and cause AC PV module overheating.

The construction of typical AC PV modules makes infield repairs time consuming. In the case of an internal wiring issue, a technician must diagnose the fault onsite in order to determine what component of the module to repair. An electrical fault may occur within the microinverter assembly 12 itself, which is secured to a PV panel 16, the diodes within junction box 14, or between the two (2) DC connections 18, 20 that contain respective DC connectors 22, 24 that connect the junction box 14 and the microinverter 26. Since a unique key or tool must be used to remove each of the junction box 14 and the microinverter 26, and to dissemble the DC connectors 22, 24 to determine which component of the AC PV module 10 is faulty, the onsite repair is time consuming and costly. Further, the wired connection between the PV panel 16 and the microinverter 26 typically includes approximately one to two feet of DC cable and a junction box, which adds cost to the PV system.

To meet the national electrical code (NEC), special DC wiring and grounding specifications exist for DC module strings capable of producing voltages as high as 600 volts. Further, installers must properly manage the safety risks posed by the potentially lethal DC voltages when dealing with installation of DC wiring. As a result, a certified electrical is used for proper installation of the special DC wiring. Because all of the wiring is done on-site, the process for installing the DC wiring of the PV system accounts for a significant amount of the time and cost of the overall installation of the PV system.

Therefore, it would be desirable to provide a PV system with DC connections that are easily field repairable, have a reliable and stable connection, and are less costly than the DC connections of known PV systems.

BRIEF DESCRIPTION OF THE INVENTION

In accordance with one aspect of the invention, a system and method for a microinverter mounting assembly includes a microinverter assembly and a panel direct current (DC) connector. The microinverter assembly has a housing, a microinverter disposed within the housing, and a microinverter DC connector disposed within the housing and electrically coupled to the microinverter, the microinverter DC connector with a bottom panel having a locking recess formed therein and at least one electrical contact disposed within an opening formed in the bottom panel. In addition, the panel DC connector has a mounting substrate, a locking tab extending from the mounting substrate, and at least one electrical contact positioned on the mounting substrate. Further, the locking tab of the panel DC connector interfits within the locking recess of the microinverter DC connector to form a locking mechanism that prevents rotation of the microinverter DC connector when in a locked position.

In accordance with another aspect of the invention, a method of manufacturing a photovoltaic (PV) module includes providing a PV panel, coupling a panel DC connector to an inactive surface of the PV panel, providing a microinverter assembly comprising a microinverter and a microinverter DC connector electrically coupled to the microinverter, aligning the microinverter assembly with the panel DC connector in an unlocked position wherein a bottom panel of the microinverter DC connector is positioned on a mounting substrate of the panel DC connector and a locking recess formed in the bottom panel of the microinverter DC connector is disengaged from a locking tab extending from the mounting substrate of the panel DC connector, and rotating the microinverter assembly from the unlocked position to a locked position wherein the locking tab engages the locking recess and an electrical contact of the panel DC connector is electrically coupled with an electrical contact of the microinverter DC connector.

In accordance with yet another aspect of the invention, a PV module assembly including a PV panel, a panel DC connector coupled to an inactive side of the PV panel, and a microinverter assembly. The panel DC connector has a mounting substrate, at least one electrical contact positioned on the mounting substrate, and a locking tab extending outward from the mounting substrate. In addition, the microinverter assembly has a cover, a microinverter disposed within the cover, and a microinverter DC connector disposed within the cover and electrically coupled to the microinverter. The microinverter DC connector includes a bottom panel and at least one electrical contact electrically coupled to the microinverter and positioned within an opening in the bottom panel. Further, the locking tab has a raised portion that is received within the locking recess.

These and other advantages and features will be more readily understood from the following detailed description of preferred embodiments of the invention that is provided in connection with the accompanying drawings.

BRIEF DESCRIPTION OF THE DRAWINGS

The drawings illustrate embodiments presently contemplated for carrying out the invention.

In the drawings.

DETAILED DESCRIPTION

Embodiments of the invention provide for a photovoltaic (PV) module that includes an improved electrical connection between the microinverter and the PV panel by way of a locking mechanism provided on the corresponding DC connectors of the microinverter and PV panel. The locking mechanism allows the microinverter to be attached and detached from the PV panel with minimal or no tool use. As a result, the microinverter can be quickly installed and removed so as to reduce the time and cost associated with installation and field replacement.

Figure 2:
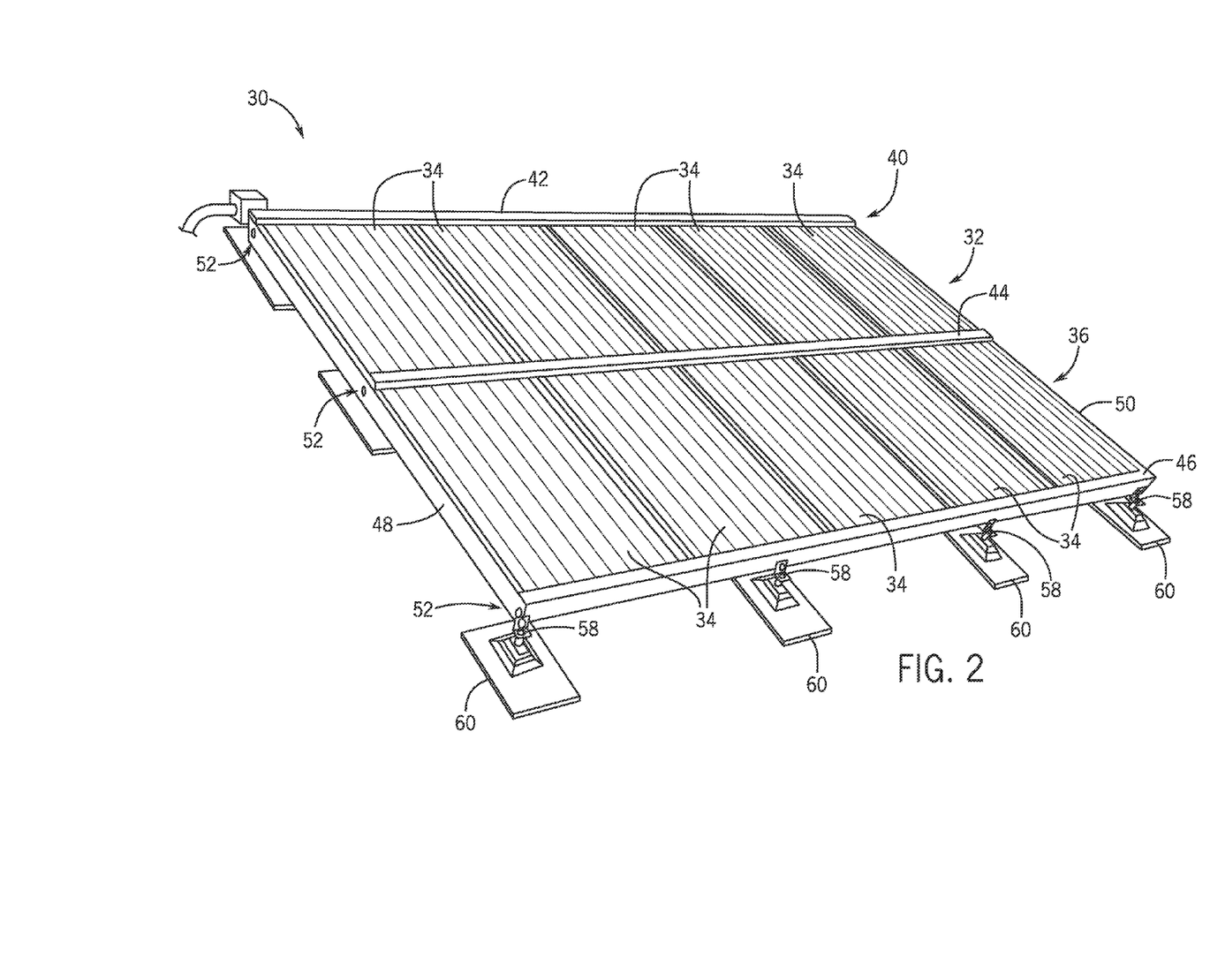
FIG. 2 is a front perspective view of a PV system, according to an embodiment of the invention.
Figure 3:
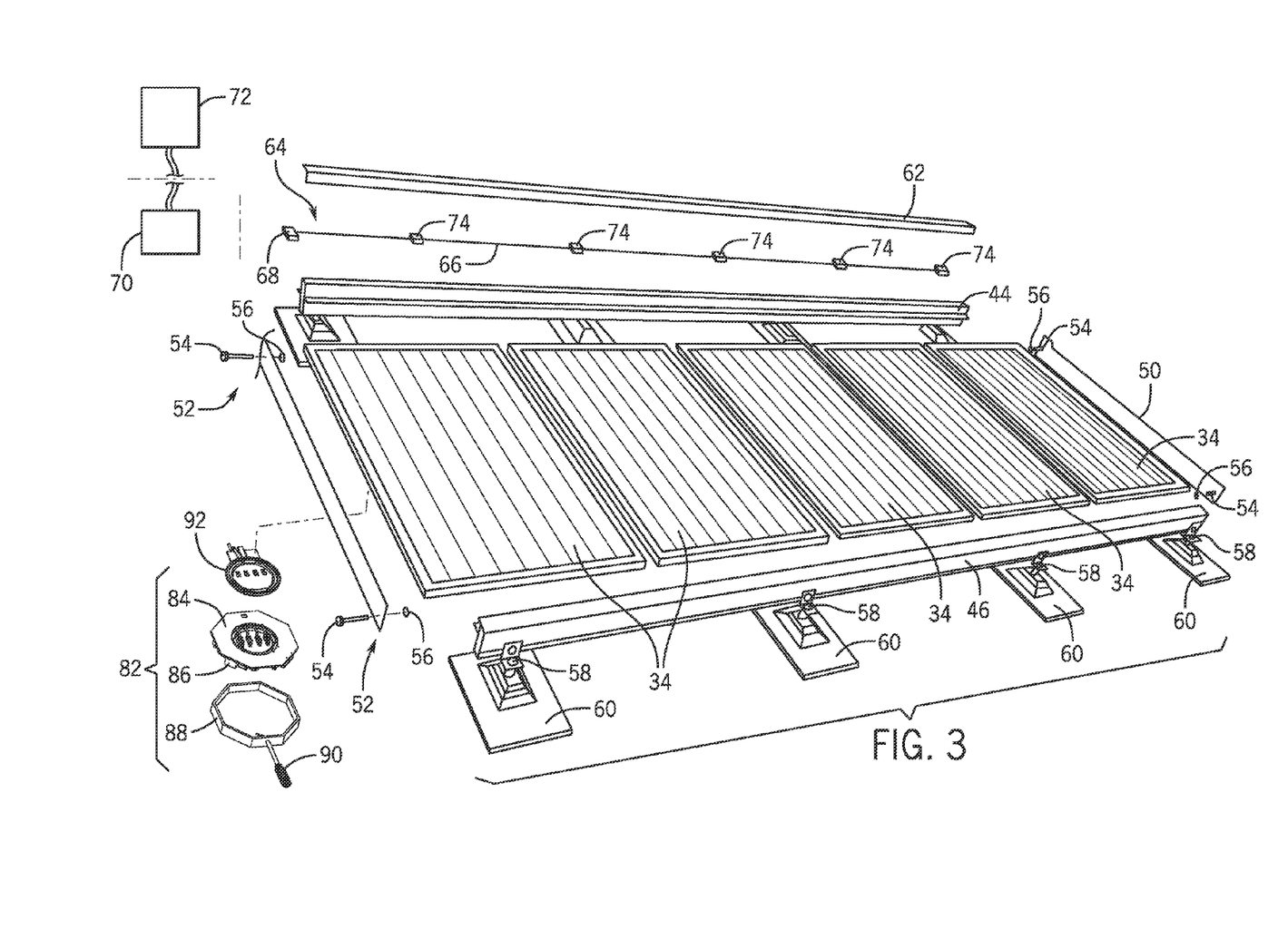
FIG. 3 is an exploded perspective view of a portion of the PV system shown in FIG. 2.

Referring first to FIG. 2, a PV system 30 is shown according to an embodiment of the invention. PV system 30 includes a first row 32 containing at least one PV module 34, a second row 36 containing at least one PV module 34, and a rail system 40. FIG. 3 is an exploded view of the second row 36 of PV system 30. Each PV module 34 includes microinverter assembly 84 and corresponding panel DC connector 92, as described in more detail with respect to FIGS. 4A-7. It is contemplated that PV system 30 may contain more or less than two (2) rows of AC PV modules 34 and more or less than five (5) PV modules 34 per row in alternative embodiments of the invention.

Referring now to FIGS. 2 and 3 together where appropriate, rail system 40 includes a top rail section 42, a central rail section 44, a bottom rail section 46, a first grounding bar 48, and a second grounding bar 50. As shown in FIG. 2, first and second grounding bars or support bars 48, 50 are positioned in a perpendicular arrangement to rail sections 42, 44, 46. Fastener assemblies 52 include respective pairs of fasteners 54 and star washers 56 that mechanically and electrically couple first and second grounding bars 48, 50 to top rail section 42 and bottom rail section 46 in one embodiment. L-brackets 58 mount rail sections 42, 44, 46 to mounting stanchions 60.

Central rail section 44 includes a rail cover 62, which is secured to central rail section 44 using known fasteners such as, for example, retention clips, and an AC harness 64 positioned within bottom rail section 46 beneath rail cover 62. AC harness 64 includes a wire assembly 66 electrically coupled to the output of PV modules 34 and an end connector 68 coupleable to a connector box 70 for delivery to a load panel 72. A number of AC connectors 74 are positioned at fixed intervals along the length of AC harness 64 to interface with respective PV modules 34.

Figures 4A, 4B:
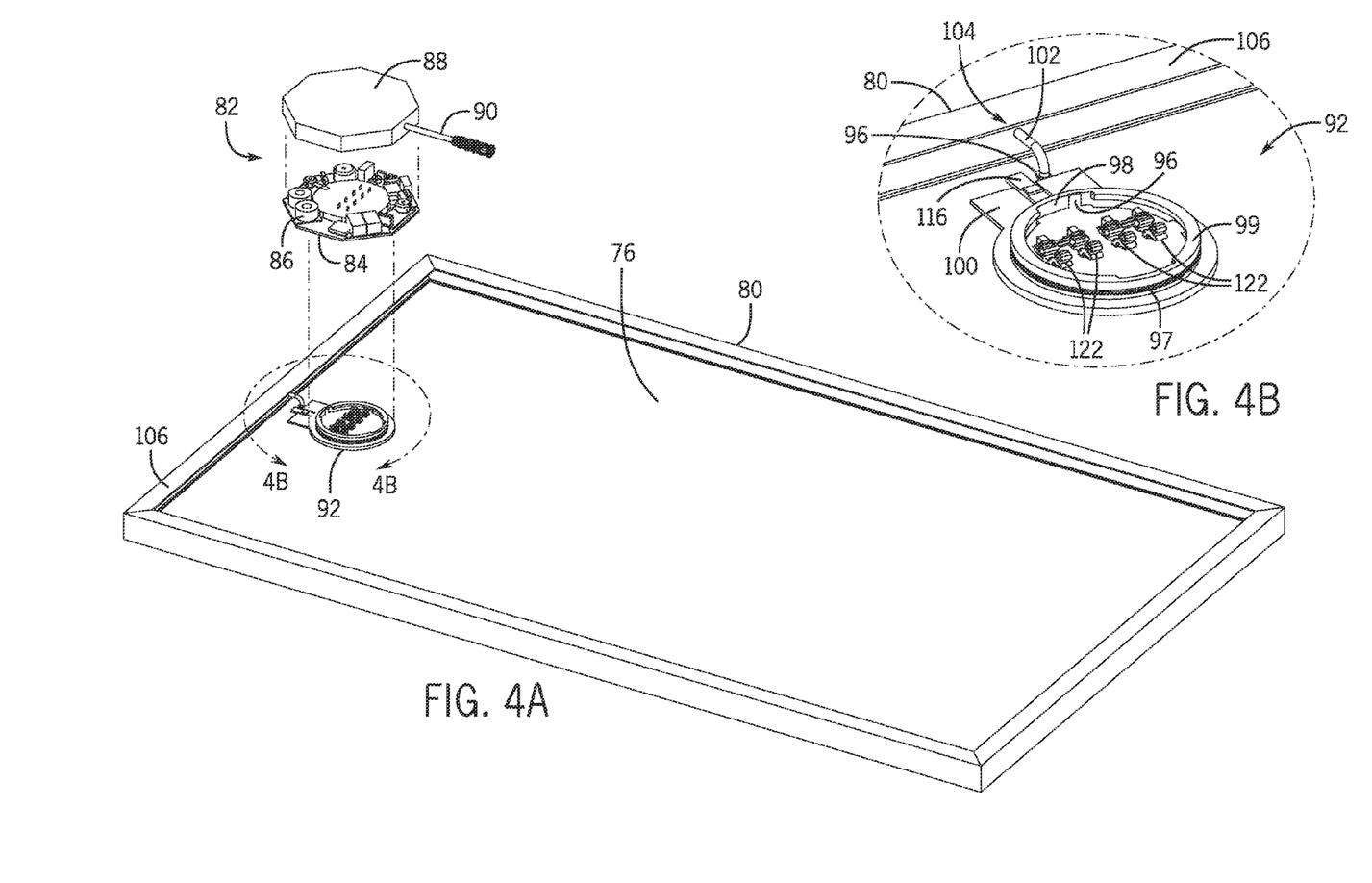
FIG. 4A is an exploded perspective view of the inactive side of a PV module of the PV system of FIG. 2, according to an embodiment of the invention.
FIG. 4B is an enlarged version of portion 4B of FIG. 4A showing a detailed view of a DC connector coupled to the PV panel, according to an embodiment of the invention.

FIG. 4A is an exploded perspective view of the back or inactive side 76 of PV module 34 of PV system 30 of FIG. 2. PV module 34 includes a PV panel 80 and a microinverter assembly 82. Microinverter assembly 82 includes a DC connector 84 that is electrically coupled to a microinverter 86. In one embodiment of the invention, microinverter 86 is configured to convert the DC output generated by PV panel 80 into an AC output. However, it is also contemplated that microinverter 86 may be configured to convert the DC output generated by PV panel 80 into a DC output having different voltage and/or current levels. Both DC connector 84 and microinverter 86 are positioned within a microinverter cover/housing 88. Housing 88 may comprise any suitable material, for example, but not limited to, plastic or metal. A microinverter wiring harness 90 having a pair of AC lead wires, a neutral lead wire, a ground lead wire (not shown) provided therein is electrically coupled to microinverter 86 and extends through housing 88, so as to couple with connectors 74 of AC wire harness 64 (FIG. 3).

Alternatively, each microinverter assembly 82 may include an input wire harness in addition to the output wire harness 90 shown in FIG. 3. In this embodiment, microinverter assemblies 82 of PV system 30 would be daisy-chained together by coupling an output wire harness of one PV module to an input wire harness of another PV module, and AC wire harness 64 would be omitted from the PV system.

A DC connector 92 is coupled or bonded to the inactive side 76 of PV panel 80 and is constructed to mate with circular DC connector 84 of microinverter assembly 82. In one embodiment, mounting substrate 100 of DC connector 92 is coupled to PV panel 80 using a sealant or adhesive 94 (shown in FIG. 7) such as silicon, as one example, that is applied within a groove 91 formed in a bottom surface of DC connector 92. In addition to adhering mounting substrate 100 of DC connector 92 to PV panel 80, adhesive 94 creates a water-tight seal that prevents water from damaging the connection between DC connector 92 and PV panel 80. Microinverter housing 88 is configured such that when panel DC connector 92 and microinverter DC connector 84 are mated, both DC connectors 84, 92 are concealed within housing 88 and protected from exposure to the external environment. In alternative embodiments, mechanical fasteners may be provided to couple DC connector 92 to PV panel 80. In such embodiments, adhesive 94 may be retained to provide an environmental seal for electrical connections between the DC connector 92 and PV panel 80.

FIG. 4B shows an enlarged version of portion 4B of FIG. 4A and provides a detailed view of the electrical ground connection between panel DC connector 92 and PV panel 80. As shown, panel DC connector 92 includes a grounding contact 96 in the form of an L-shaped grounding tab that extends from an inner wall 98 of panel DC connector 92 to a base substrate or mounting substrate 100 of panel DC connector 92, as shown in further detail in FIG. 5. A grounding wire 102 electrically couples grounding tab 96 to a grounding point 104 on PV panel 80. As such, panel DC connector 92 is electrically grounded to PV panel 80 via grounding tab 96 and grounding wire 102. While FIG. 4B illustrates that grounding point 104 is located on a frame 106 of PV panel 80, it is contemplated that grounding point 104 may be positioned at an alternative location on PV panel 80 in other embodiments.

Figure 5:
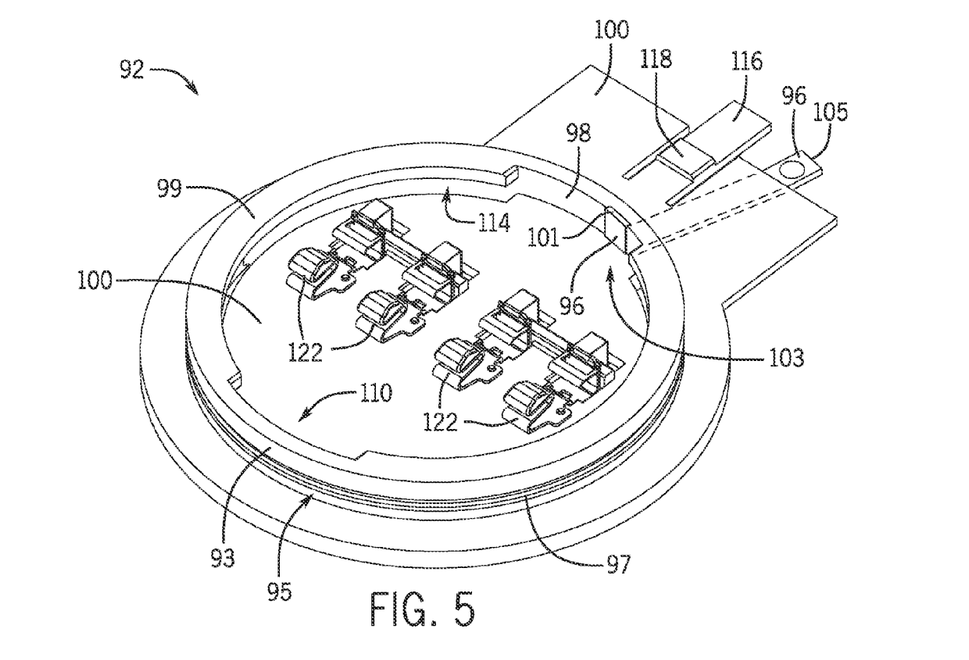
FIG. 5 is a perspective view of the panel DC connector shown in FIG. 4A, according to an embodiment of the invention

As illustrated in FIG. 5, a first end 101 of the grounding tab 96 of panel DC connector 92 is coupled to or positioned adjacent an inner wall 98 of panel DC connector 92 and extends through an opening 103 in the mounting substrate 100 of panel DC connector 92. A second end 105 extends outward from the mounting substrate 100 and provides a connection point for the grounding wire 102 (FIG. 4B). The first end 101 of grounding tab 96 is positioned to engage a microinverter grounding contact 108 of the panel DC connector 92, which extends upward from a recessed surface 89 of a bottom panel 85 of the microinverter DC connector 84 when the panel DC connector 92 and the microinverter DC connector 84 are in a locked position, as described below. Consequently, microinverter DC connector 84 and PV panel 80 are electrically grounded to each other via grounding contact 108, grounding tab 96 and grounding wire 102 (FIG. 4B).

In addition, while grounding contact 96 is depicted as an L-shaped grounding tab coupled to inner wall 98, extending through opening 103, and extending outward from mounting substrate 100, it is contemplated that grounding contact 96 may take other forms. For example, grounding contact may be formed as a flat rectangular tab that makes contact with a ground connection on recessed surface 89 of microinverter DC connector 84 or as an S-shaped grounding tab that extends along a top surface of mounting substrate 100 adjacent inner wall 98, through opening 103, and extends away from mounting substrate 100 along a bottom surface of mounting substrate 100.

Figure 6:
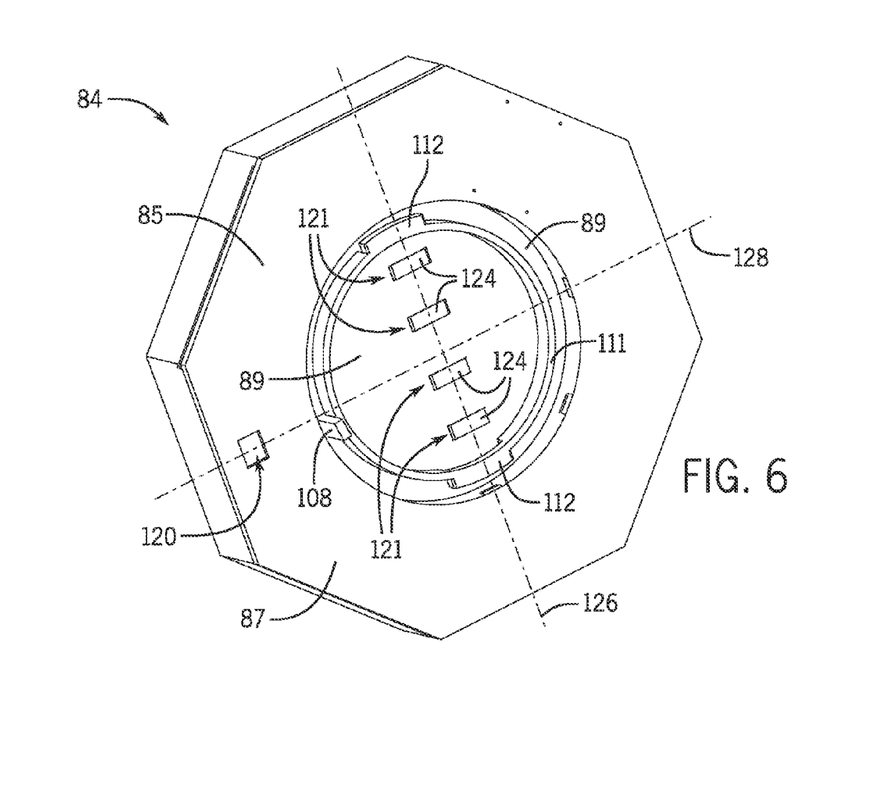
FIG. 6 is a perspective view of the bottom surface of the microinverter assembly shown in FIG. 4A, according to an embodiment of the invention.

A circular protrusion 99 extends upward from the mounting substrate 100. Recesses 110 are formed in the inner wall 98 of the circular protrusion 99 of panel DC connector 92, and are constructed to mate with corresponding alignment tabs 112 extending from a circular protrusion 111 extending from the recessed surface 89 of the bottom panel 85 of the microinverter DC connector 84. In an alternative embodiment, microinverter DC connector 84 is configured with recesses and panel DC connector 92 is configured with alignment tabs. Circular protrusion 99 of panel DC connector 92 is sized to surround circular protrusion 111 of microinverter DC connector 84. Once tabs 112 have interfit and passed through recesses 110, microinverter DC connector 84 may be rotated while tabs 112 traverse an alignment slot or groove 114 formed on inner wall 98 of panel DC connector 92. In a one embodiment of the invention, alignment slot 114 is formed about the entire circumference of inner wall 98. Alternatively, alignment slot 114 may include a plurality of grooves formed about the circumference of inner wall 98 for a certain length, so as to limit the distance of rotation of microinverter DC connector 84. In addition, alternative embodiments may use more or less than two (2) recesses 110 and tabs 112. In addition, a gasket or o-ring 97 fits within a groove 95 formed within an outer wall 93 of circular protrusion 99 of panel DC connector 92 in order to provide a waterproof seal between microinverter DC connector 84 and panel DC connector 92 when DC connectors 84, 92 are engaged.

Panel DC connector 92 also includes a flexible locking tab 116 that extends outward from mounting substrate 100 of panel DC connector 92. Locking tab 116 includes a raised portion 118 sized to fit into a corresponding locking recess 120 formed within an upper surface 87 of the bottom panel 85 of microinverter DC connector 84. After tabs 112 is inserted within the alignment slot 114 of panel DC connector 92, microinverter DC connector 84 is able to freely rotate in an unlocked position until locking tab 116 mates with locking recess 120. Thereafter microinverter DC connector 84 and panel DC connector 92 are held in a locked position.

Panel DC connector 92 contains four (4) exposed electrical contacts 122 positioned on mounting substrate 100, which allow for electrical coupling with microinverter DC connector 84. In some embodiments, electrical contacts 122 are ribbon conductors or copper spring contacts, however, electrical contacts 122 may be constructed of differing materials and/or have a different configuration. When microinverter DC connector 84 and panel DC connector 92 are in the locked position, electrical connections 122 of panel DC connector 92 are engaged with corresponding electrical connections 124 of microinverter DC connector 84, which are positioned within a plurality of openings 121 formed in the recessed surface 89 of the bottom panel 85 of microinverter DC connector 84.

In an exemplary embodiment, electrical contacts 124 are flat copper contacts, however, electrical contacts 124 may be constructed of differing materials and/or a different configuration. As one example, electrical contacts 122 of panel DC connector 92 may be configured as flat contacts, while electrical contacts 124 of microinverter DC connector 84 are flexible or spring contacts. Further, the number of electrical contacts 110, 124 may be greater or less than four (4) in alternative embodiments.

Figure 7:
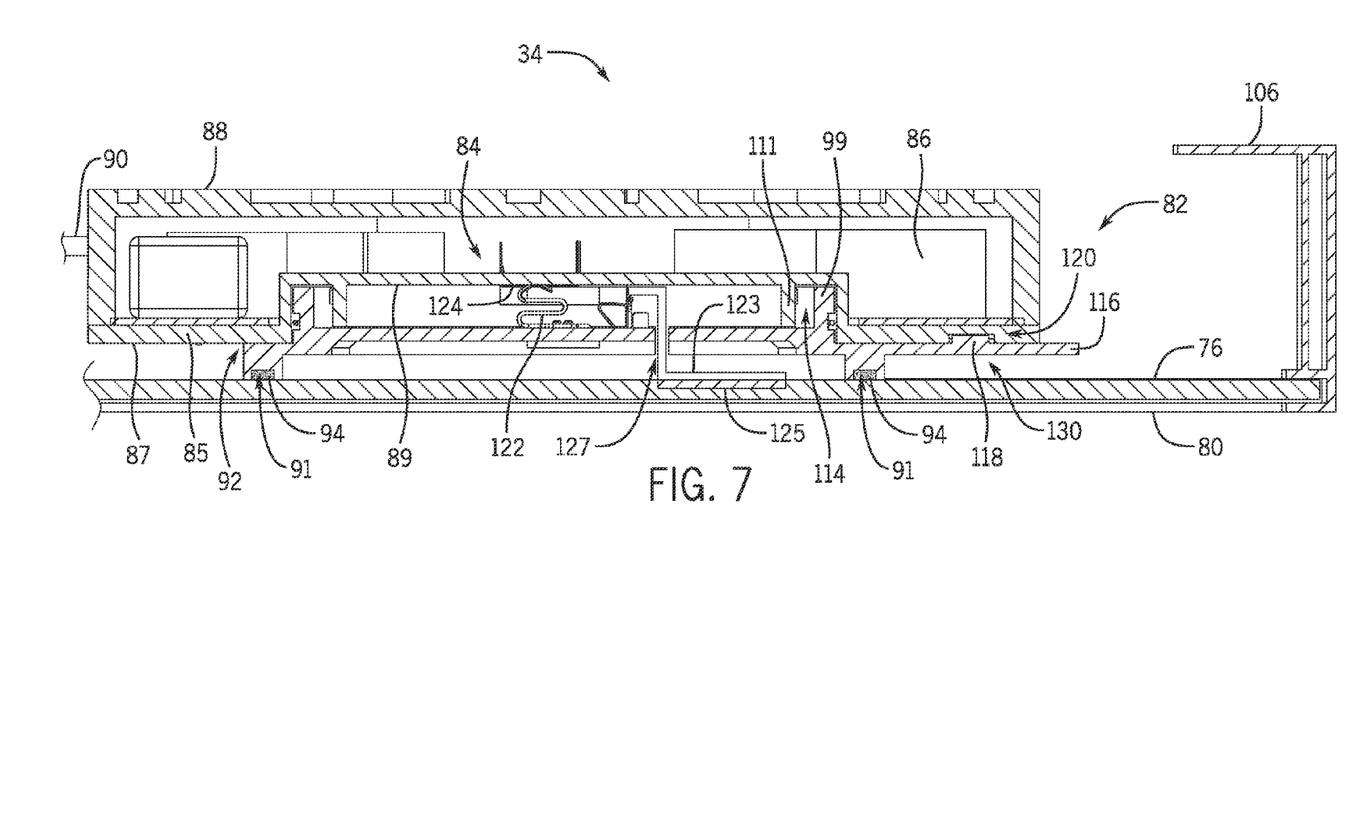
FIG. 7 is a side cross-sectional view of a portion of the PV module of FIG. 2, which illustrates the DC connector of the microinverter assembly in FIG. 4A and the DC connector of the PV module in FIG. 4A engaged in a locked position.

FIG. 7 provides a detailed view of the connection between microinverter DC connector 84, panel DC connector 92, and PV panel 80 when DC connectors 84, 92 are in the locked position. As shown, a lower portion 123 of each electrical connection 122 of DC connector 92 extends through an opening 127 in DC connector 92 and is electrically coupled to an electrical contact 125 disposed on the inactive side 76 of PV panel 80. This electrical coupling may be made via soldering, brazing, or another known joining technique. As such, electrical connections 122 of DC connector 92 are electrical coupled to PV panel 80 via a wireless connection. Alternatively, a wired connection may be provided between DC connector 92 and PV panel 80.

Referring again to FIG. 5 and FIG. 6, to unlock microinverter DC connector 84 from panel DC connector 92, the locking tab 116 is depressed downward toward the inactive side 76 of PV panel 80 in order to disengage raised portion 118 of locking tab 116 and locking recess 120. After pressing locking tab 116 toward the inactive side 76 of PV panel 80, microinverter DC connector 84 freely rotates with respect to panel DC connector 92 and can be disengaged therefrom by rotating the microinverter DC connector 84 in a clockwise or counterclockwise direction until the tabs 112 are aligned with corresponding alignments slots 114 at which point microinverter DC connector 84 may be lifted upward and away from panel DC connector 92.

While FIG. 6 depicts microinverter assembly 82 as having a generally octagonal shape, it is contemplated that microinverter assembly 82 may be in the form of any shape. In exemplary embodiments of the invention, microinverter assembly 82 is designed such that the weight of microinverter assembly 82 is distributed symmetrically or substantially symmetrically along axis 126 and axis 128, thereby permitting microinverter assembly 82 to be secured to PV panel 80 without additional structural supports and reduce stress levels.

Now referring to FIG. 7, a cross-sectional view of a portion of PV module 34 is provided to show detail of microinverter DC connector 84 engaged with panel DC connector 92 in the locked position. Together, locking tab 116 and locking recess 120 form a locking mechanism 130 that retains microinverter DC connector 84 and panel DC connector 92 in the locked position. Panel DC connector 92 and microinverter assembly 82 are spaced apart from frame 106 and may be located at any point on the inactive side 76 of PV panel 80.

Figure 8:
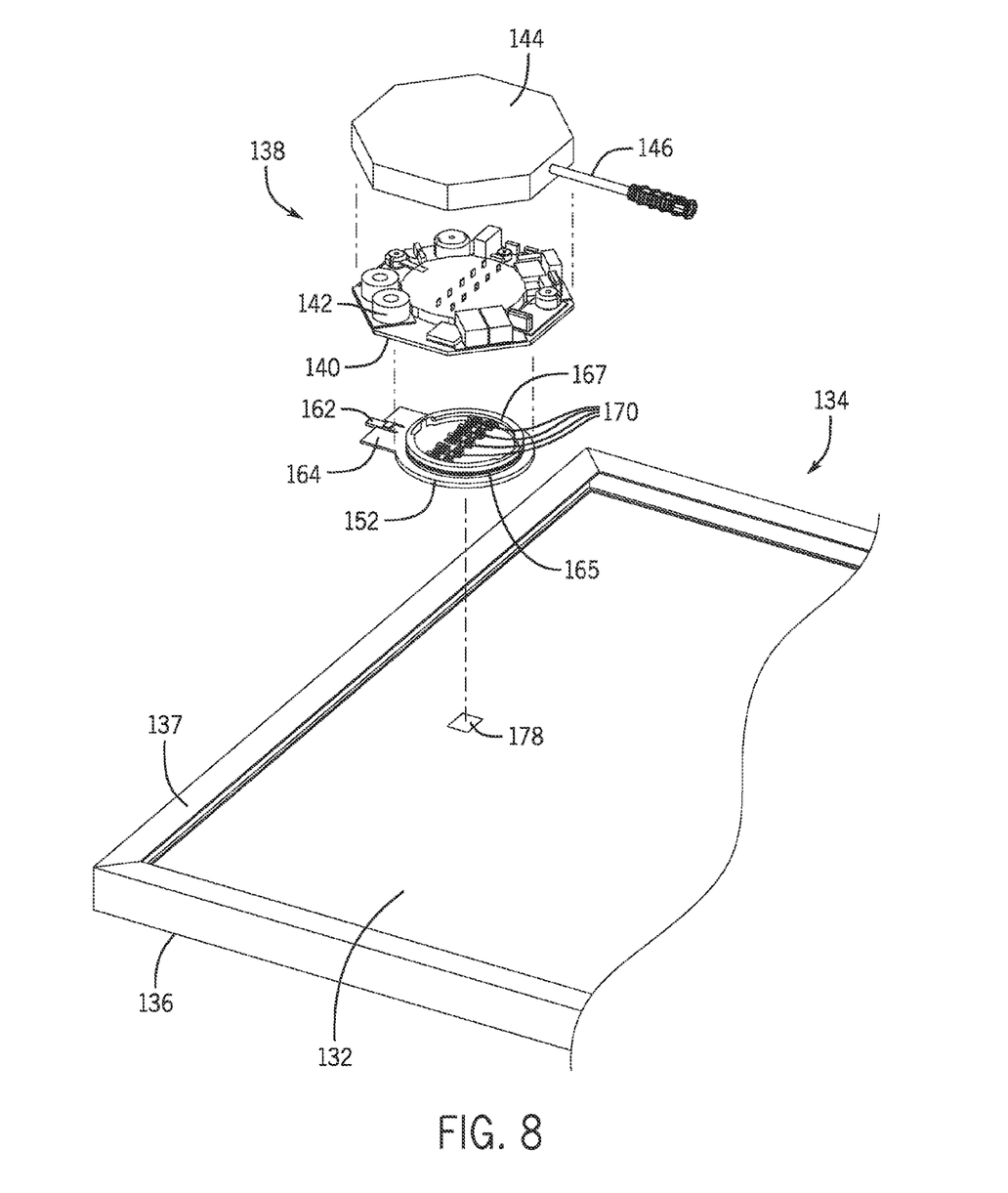
FIG. 8 is an exploded perspective view of a portion of an inactive side of a PV module suitable for use with the PV system shown in FIG. 2, according to another embodiment of the invention.

FIG. 8 illustrates an exploded perspective view of the back or inactive side 132 of a PV module 134 that is useable with the PV system 30 shown in FIG. 2. PV module 134 includes a PV panel 136 and a microinverter assembly 138 having a DC connector 140 that is electrically coupled to a microinverter 142 and positioned within a microinverter cover or housing 144. Similar to microinverter 86 (FIG. 4A), microinverter 142 may be configured to convert the DC output generated by PV panel 136 into an AC output or into a DC output having different voltage and/or current levels than that generated by the PV panel 136, according to alternative embodiments. Microinverter housing 144 conceals DC connectors 140, 152 when the components are locked together, thereby protecting the components from exposure to the external environment. A microinverter wiring harness 146 is electrically coupled to microinverter 142 and extends through housing 144. Like microinverter assembly 82 of FIG. 4A, the weight of microinverter assembly 138 is symmetrical or substantially symmetrical along axis 148 and axis 150 and may be formed having an octagonal shape as shown, or having an alternative shape based on design specifications.

Figure 9:
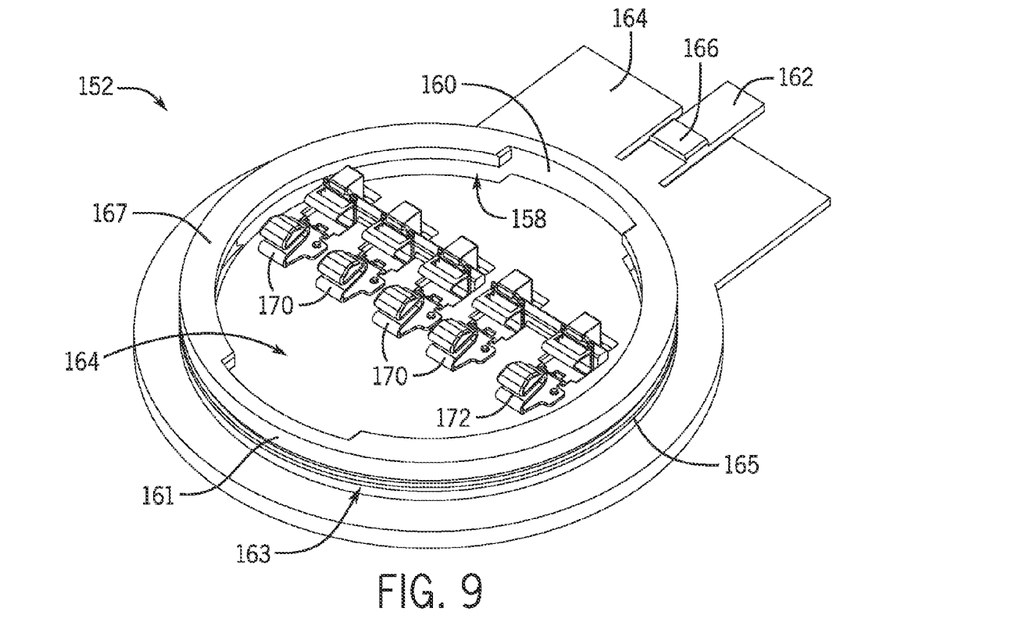
FIG. 9 is a perspective view of the panel DC connector shown in FIG. 8, according to another embodiment of the invention.
Figure 10:
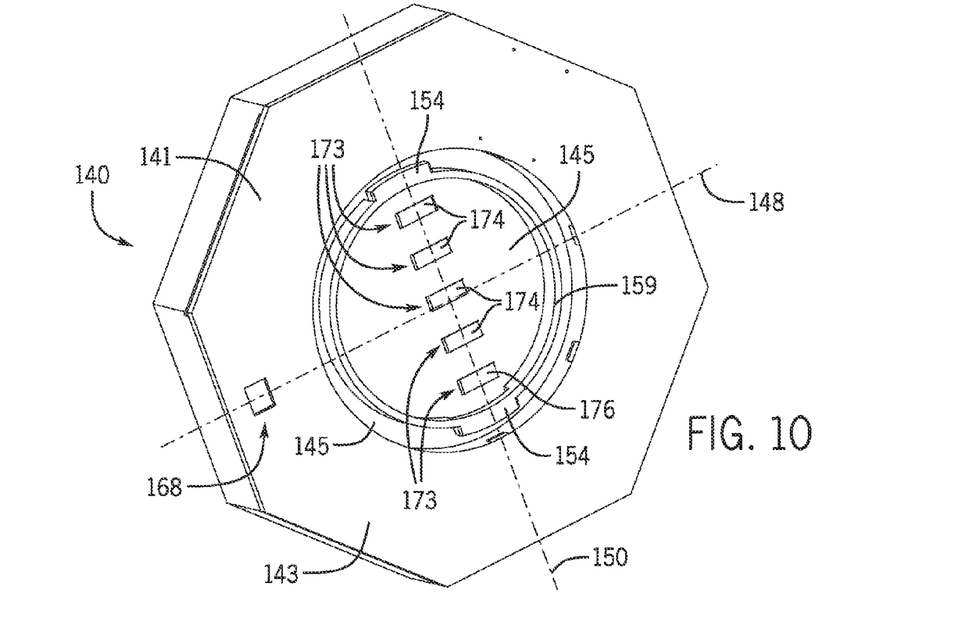
FIG. 10 is a perspective view of the bottom surface of the microinverter assembly shown in FIG. 8, according to another embodiment of the invention.

A panel DC connector 152 is coupled or bonded to the inactive side 132 of PV panel 136 via an adhesive or other coupling means (not shown). Similar to panel DC connector 92, each electrical connection 170 of panel DC connector 152 includes a lower portion that extends through the panel DC connector 152 and electrically couples with an electrical contact disposed on the inactive side 132 of PV panel 136. As shown in FIGS. 9 and 10, panel DC connector 152 is constructed to mate with DC connector 140 of microinverter assembly 138 by way of alignment tabs 154 and corresponding recesses 156 formed in circular protrusions 159, 167 extending from panel DC connector 152 and microinverter DC connector 140, in a similar manner as described with respect to panel DC connector 92 and microinverter DC connector 84 of FIGS. 5 and 6. It is also contemplated that microinverter DC connector 140 may include recesses and panel DC connector 152 may include alignment tabs in alternative embodiments of the invention. Once tabs 154 pass through recesses 156, tabs 154 rotate within an alignment slot/groove 158 formed on inner wall 160 of the circular protrusion 159 of panel DC connector 152. Similar to panel DC microinverter of FIG. 5, panel DC microinverter 152 includes a gasket or o-ring 165 positioned within a groove 163 formed within an outer wall 161 of circular protrusion 167 in order to provide a waterproof seal between microinverter DC connector 150 and panel DC connector 152 when DC connectors 140, 152 are engaged.

Also similar to panel DC connector 92 and microinverter DC connector 84 of FIGS. 5 and 6, panel DC connector 152 includes a locking tab 162 that extends from mounting substrate 164 of panel DC connector 152. A raised portion 166 of locking tab 166 fits within a corresponding locking recess 168 formed in an upper surface 143 of bottom panel 141 of microinverter DC connector 140. Together, locking tab 162 and locking recess 168 form a locking mechanism. When raised portion 166 is positioned within locking recess 168, microinverter DC connector 140 is held in a locked position with respect to panel DC connector 152. Microinverter DC connector 140 and panel DC connector 148 may be moved into an unlocked position by depressing locking tab 162 to disengage raised portion 166 from locking recess 168, thereby permitting microinverter DC connector to be rotated and removed from engagement with panel DC connector 148.

Referring now to FIGS. 8, 9, and 10 together as appropriate, panel DC connector 152 includes a plurality of electrical contacts 170 provided on a mounting substrate 164 of panel DC connector 152. A grounding contact 172 is also provided on mounting substrate 164 and configured in a similar manner as electrical contacts 154. In one embodiment contacts 170, 172 are copper spring contacts. However, it is contemplated that contacts 170, 172 may be constructed of differing materials and/or having a different configuration.

Microinverter DC connector 140 includes a plurality of electrical contacts 174 or leads positioned within openings 173 formed in recessed surface 145 of a bottom panel 141 of the microinverter DC connector 140 and arranged to electrically couple with electrical contacts 170 of panel DC connector 152. In one embodiment, electrical contacts 174 are flat copper contacts, however, electrical contacts 174 may be construed of differing materials and/or a different configuration. Microinverter DC connector 140 also includes a grounding contact 176 that extends through a corresponding opening 173 in recessed surface 145. When microinverter DC connector 140 and panel DC connector 152 are in the locked position, electrical contacts 170 of panel DC connector 152 are engaged with electrical contacts 174 of microinverter DC connector 140 and grounding contact 176 is engaged with grounding contact 172 of panel DC connector 152. Further, it is contemplated that DC connectors 140, 152 may include more or less than four (4) electrical contacts in alternative embodiments.

As shown in FIG. 10, a grounding contact 178 is provided on the inactive side 132 of PV panel 136 and is electrically connected to the frame 137 of the PV panel via a wired connection (not shown) provided by the panel manufacturer. Grounding contact 178 is electrically coupled with grounding contact 172 of panel DC connector 152 when panel DC connector 148 is installed on PV panel 136. As such, a ground connection is formed between PV panel 136, panel DC connector 152, and microinverter DC connector 140 when panel DC connector 152 and microinverter DC connector 140 are joined together in a locked position. Accordingly, PV panel 136 and microinverter assembly 138 are electrically coupled together absent any wired connection between the components in this embodiment.

Beneficially, embodiments of the invention thus provide a mounting assembly that allows for a microinverter to be mechanically and electrically coupled and decoupled from a PV panel with no or minimal usage of a tool by way of a locking mechanism and rotational engagement between a microinverter DC connector and a panel DC connector. When engaged or positioned in a locked position, the microinverter is electrically coupled to the PV panel and a ground connection in the panel DC connector engages a ground connection in the microinverter DC connector, thereby eliminating wired connections between the PV panel and microinverter.

According to one embodiment of the invention, a system and method for a microinverter mounting assembly includes a microinverter assembly and a panel DC connector. The microinverter assembly has a housing, a microinverter disposed within the housing, and a microinverter DC connector disposed within the housing and electrically coupled to the microinverter, the microinverter DC connector with a bottom panel having a locking recess formed therein and at least one electrical contact disposed within an opening formed in the bottom panel. In addition, the panel DC connector has a mounting substrate, a locking tab extending from the mounting substrate, and at least one electrical contact positioned on the mounting substrate. Further, the locking tab of the panel DC connector interfits within the locking recess of the microinverter DC connector to form a locking mechanism that prevents rotation of the microinverter DC connector when in a locked position.

According to another embodiment of the invention, a method of manufacturing a photovoltaic PV module includes providing a PV panel, coupling a panel DC connector to an inactive surface of the PV panel, providing a microinverter assembly comprising a microinverter and a microinverter DC connector electrically coupled to the microinverter, aligning the microinverter assembly with the panel DC connector in an unlocked position wherein a bottom panel of the microinverter DC connector is positioned on a mounting substrate of the panel DC connector and a locking recess formed in the bottom panel of the microinverter DC connector is disengaged from a locking tab extending from the mounting substrate of the panel DC connector, and rotating the microinverter assembly from the unlocked position to a locked position wherein the locking tab engages the locking recess and an electrical contact of the panel DC connector is electrically coupled with an electrical contact of the microinverter DC connector.

According to yet another embodiment of the invention, a PV module assembly including a PV panel, a panel DC connector coupled to an inactive side of the PV panel, and a microinverter assembly. The panel DC connector has a mounting substrate, at least one electrical contact positioned on the mounting substrate, and a locking tab extending outward from the mounting substrate. In addition, the microinverter assembly has a cover, a microinverter disposed within the cover, and a microinverter DC connector disposed within the cover and electrically coupled to the microinverter. The microinverter DC connector includes a bottom panel and at least one electrical contact electrically coupled to the microinverter and positioned within an opening in the bottom panel. Further, the locking tab has a raised portion that is received within the locking recess.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A microinverter mounting assembly comprising:
 a microinverter assembly comprising:
  a housing;
  a microinverter disposed within the housing; and
  a microinverter direct current (DC) connector disposed within the housing and electrically coupled to the microinverter, the microinverter DC connector comprising:
   a bottom panel having a locking recess formed therein; and
   at least one electrical contact disposed within an opening formed in the bottom panel; and
 a panel DC connector comprising:
  a mounting substrate;
  a locking tab extending from the mounting substrate; and
  at least one electrical contact positioned on the mounting substrate;
 wherein the locking tab of the panel DC connector interfits within the locking recess of the microinverter DC connector to form a locking mechanism that prevents rotation of the microinverter DC connector when in a locked position.

2. The assembly of claim 1 wherein the at least one electrical contact of the microinverter DC connector and the at least one electrical contact of the panel DC connector engage each other when the locking mechanism is in the locked position.

3. The assembly of claim 1 further comprising:
 a microinverter grounding contact extending outward from the bottom panel of the microinverter DC connector; and
 a grounding tab coupled to the mounting substrate of the panel DC connector;
 wherein the microinverter grounding contact and the grounding tab are electrically coupled together when the locking mechanism is in the locked position.

4. The assembly of claim 1 wherein the bottom panel of the microinverter DC connector further comprises:
 a recessed surface having an opening formed therein;
 an upper surface that surrounds the recessed surface; and
 a circular protrusion extending from the recessed surface;
 wherein the panel DC connector further comprises:
 a circular protrusion extending from the mounting substrate; and
 a gasket disposed within a groove formed within the circular protrusion; and
 wherein the circular protrusion of the panel DC connector is sized to surround the circular protrusion of the microinverter DC connector.

5. The assembly of claim 4 further comprising:
 a microinverter grounding contact extending outward from the opening formed in the recessed surface of the microinverter DC connector; and
 a panel grounding contact coupled to the mounting substrate of the panel DC connector;
 wherein the microinverter grounding contact and the panel grounding contact are positioned to electrically couple together when the locking mechanism is in the locked position.

6. The assembly of claim 4 further comprising an alignment tab extending from the circular protrusion of the microinverter DC connector, the alignment tab constructed to interfit within a recess formed in an inner wall of the circular protrusion of the panel DC connector.

7. The assembly of claim 6 wherein the alignment tab is constructed to traverse within an alignment slot formed within the inner wall of the circular protrusion of the panel DC connector when the locking mechanism transitions from an unlocked position to the locked position.

8. A photovoltaic (PV) module assembly comprising:
a PV panel;
a panel direct current (DC) connector coupled to an inactive side of the PV panel, panel DC connector comprising:
  a mounting substrate;
  at least one electrical contact positioned on the mounting substrate; and
  a locking tab extending outward from the mounting substrate; and
a microinverter assembly comprising;
  a cover;
  a microinverter disposed within the cover;
  a microinverter DC connector disposed within the cover and electrically coupled to the microinverter, the microinverter DC connector comprising:
    a bottom panel; and
    at least one electrical contact electrically coupled to the microinverter and positioned within an opening in the bottom panel; and
wherein the locking tab is received within a locking recess in the bottom panel of the microinverter DC connector to form a locking mechanism that prevents rotation of the microinverter DC connector when in a locked position.

9. The assembly of claim 8 further comprising:
a panel circular protrusion extending from the mounting substrate; and
a microinverter circular protrusion extending from the bottom panel of the microinverter DC connector;
wherein the panel circular protrusion is sized to surround the microinverter circular protrusion.

10. The assembly of claim 8 wherein the locking tab comprises a flexible structure extending outward from the mounting substrate.

11. The assembly of claim 8 wherein the at least one electrical contact of the microinverter DC connector and the at least one electrical contact of the panel DC connector are electrically engaged when the locking tab is received within the locking recess.

12. The assembly of claim 8 wherein the bottom panel further comprises:
an upper surface having the locking recess formed therein; and
a recessed surface having the opening formed therein.

13. The assembly of claim 12 further comprising:
a panel ground contact coupled to the mounting substrate of the panel DC connector;
a microinverter ground contact extending from the recessed surface of the bottom panel of the microinverter DC connector; and
wherein the panel ground contact is constructed to electrically couple with the microinverter ground contact when the locking tab is received within the locking recess.

14. The assembly of claim 13 further comprising a grounding wire electrically coupled between the PV panel and a grounding tab of the panel DC connector.

15. The assembly of claim 13 further comprising a grounding contact disposed on the inactive side of the PV panel;
wherein the grounding contact is electrically coupled to a frame of the PV panel; and
wherein grounding contact is electrically coupled to the panel ground contact.

* * * * *